(12) United States Patent
Beauchamp (10) Patent No.: US 10,661,388 B2
(45) Date of Patent: May 26, 2020

(54) SYSTEM FOR INTRODUCING COMBUSTIBLE POWDERS TO A THREE DIMENSIONAL PRINTER

(71) Applicant: 3D Systems, Inc., Rock Hill, SC (US)

(72) Inventor: Robert Beauchamp, Carlsbad, CA (US)

(73) Assignee: 3D Systems, Inc., Rock Hill, SC (US)

( * ) Notice: Subject to any disclaimer, the term of this patent is extended or adjusted under 35 U.S.C. 154(b) by 239 days.

(21) Appl. No.: 15/949,420

(22) Filed: Apr. 10, 2018

(65) Prior Publication Data

US 2018/0290237 A1 Oct. 11, 2018

Related U.S. Application Data

(60) Provisional application No. 62/483,709, filed on Apr. 10, 2017.

(51) Int. Cl.
| | |
|---|---|
| *B23K 26/144* | (2014.01) |
| *B33Y 40/00* | (2020.01) |
| *B33Y 30/00* | (2015.01) |
| *B23K 37/00* | (2006.01) |
| *B23K 26/12* | (2014.01) |
| *B23K 26/342* | (2014.01) |
| *B22F 3/105* | (2006.01) |

(52) U.S. Cl.
CPC .......... *B23K 26/144* (2015.10); *B22F 3/1055* (2013.01); *B23K 26/123* (2013.01); *B23K 26/128* (2013.01); *B23K 26/342* (2015.10); *B23K 37/006* (2013.01); *B33Y 30/00* (2014.12); *B33Y 40/00* (2014.12); *B22F 2998/10* (2013.01); *B22F 2999/00* (2013.01)

(58) Field of Classification Search
CPC .......... B05B 11/0054; B65D 2583/005; B67D 1/0078; B33Y 40/00; B23K 26/144
USPC ........................................................ 222/325
See application file for complete search history.

(56) References Cited

U.S. PATENT DOCUMENTS

| | | | |
|---|---|---|---|
| 2011/0211016 A1* | 9/2011 | Davidson | B29C 64/35 347/36 |
| 2016/0361873 A1* | 12/2016 | Maier | B29C 64/106 |
| 2018/0185915 A1* | 7/2018 | Beauchamp | B33Y 40/00 |
| 2019/0084231 A1* | 3/2019 | Chanclon Fernandez | B22F 3/1055 |

* cited by examiner

*Primary Examiner* — Geoffrey S Evans (57) ABSTRACT

A three dimensional printing system includes a powder delivery system and a controller. The powder delivery system includes a cartridge, a powder transfer assembly, a vacuum source, and source of inert gas. The cartridge includes a lower portion defining a lower cavity containing powder and an upper portion. The powder transfer assembly includes a cowling and a loader suction tube that extends through the cowling. The controller is configured to: (1) lower the cowling into sealing engagement with the upper portion of the cartridge whereby an upper cavity is defined between the cowling and the upper portion of the cartridge, (2) operate the source of inert gas to positively pressurize the upper cavity, and (3) lower the loader suction tube into the powder while operating the vacuum source to extract the powder.

19 Claims, 8 Drawing Sheets

SYSTEM FOR INTRODUCING COMBUSTIBLE POWDERS TO A THREE DIMENSIONAL PRINTER

CROSS REFERENCE TO RELATED APPLICATIONS

This non-provisional patent application claims priority to U.S. Provisional Application Ser. No. 62/483,709, Entitled "SYSTEM FOR INTRODUCING COMBUSTIBLE POWDERS TO A THREE DIMENSIONAL PRINTER" by Robert Beauchamp, filed on Apr. 10, 2017, incorporated herein by reference under the benefit of 35 U.S.C. 119(e).

FIELD OF THE INVENTION

The present disclosure concerns an apparatus and method for fabrication of solid three dimensional (3D) articles of manufacture from powdered materials that are sensitive to oxidation and contamination. In particular, the present disclosure describes a system and method for storing and delivering material such as powdered metal to a three dimensional printer which minimizes risks of contamination and combustion.

BACKGROUND

Three dimensional (3D) printing systems are in rapidly increasing use for purposes such as prototyping and manufacturing. One type of three dimensional printer utilizes a layer-by-layer process to form a three dimensional article of manufacture from metal powder. In this process a layer of powder is dispensed and a laser and/or particle beam is utilized to selectively melt the powder layer to form a layer of the article. One challenge with this process is in how to handle the metal powder including storage and delivery to the three dimensional printer.

Metal powders are expensive and combustible. With their handling there are risks of contamination and combustion. Because of the latter, the metal powders are processed in an inert gas such as argon during the printing process.

However, storage and handling prior to printing still has some shortcomings. The metal powder is typically stored in a drum and then manually loaded into a hopper that forms part of a three dimensional printer. Besides risk of combustion and contamination, these processes can expose the working environment to metal powder dust which can be a health hazard. There is an ongoing need to improve these storage and handling processes for metal powder. Other systems may also benefit from such improvements such as those that utilize toxic and/or reactive polymer powders.

SUMMARY

In a first aspect of the disclosure a three dimensional printing system includes a powder delivery system and a controller. The powder delivery system includes a cartridge, a powder transfer assembly, a vacuum source, and a source of inert gas. The cartridge includes a lower portion defining a lower cavity containing powder and an upper portion. The powder transfer assembly includes a cowling and a loader suction tube that extends through the cowling. The controller is configured to: (1) lower the cowling into sealing engagement with the upper portion of the cartridge whereby an upper cavity is defined between the cowling and the upper portion of the cartridge, (2) operate the source of inert gas to positively pressurize the upper cavity, and (3) lower the loader suction tube into the powder while operating the vacuum source to extract the powder. The powder includes one or more of a metal powder, a reactive polymer powder, and a toxic powder.

In one implementation the controller includes a processor coupled to an information storage device. The information storage device includes a non-transient or non-volatile storage device storing software instructions that, when executed by the processor, perform methods described above and below. The controller is responsive to signals it receives from various sensors including pressure sensors. The controller operates one or more vacuum subsystems and/or sources of inert gas and the operational instructions are at least partially responsive to the signals from the pressure sensors. The controller also operates various valves and the powder transfer assembly. The controller can be at one location or distributed among multiple locations within the three dimensional printing system.

In another implementation the three dimensional printing system includes a vacuum subsystem under control of the controller. The vacuum subsystem has a vacuum inlet that provides the vacuum source coupled to the loader suction tube. The vacuum subsystem also has an exhaust that provides the source of inert gas to the upper cavity.

In a second aspect of the disclosure, a three dimensional printing system includes a powder delivery system. The powder delivery system includes a cartridge that further includes (1) a lower portion defining a lower cavity for containing powder, (2) a thin sealing member that seals the lower cavity from an outside atmosphere before being pierced by a loader suction tube, (3) a top lid portion that covers the thin sealing member and defines an upper opening to allow the loader suction tube to gain access to the thin sealing member, and (4) an upper portion defining a peripheral sealing surface to allow a cowling to seal over the upper opening.

In one implementation the cartridge includes a molded vessel that defines an inside surface that further defines the lower cavity. In a first embodiment a collapsible bag is disposed in the lower cavity that contains the powder. In a second embodiment the molded vessel defines the peripheral sealing surface.

In another implementation the upper portion of the cartridge has an upper annular rim that tapers upwardly and defines the peripheral sealing surface. The peripheral sealing surface faces radially outwardly for engaging a inside sealing surface of the cowling that faces radially inwardly. The peripheral sealing surface includes a compressible member to provide compliance and sealing engagement with the inside sealing surface of the cowling.

In yet another implementation the powder delivery system includes a powder transfer assembly that includes the loader suction tube, the cowling, and a sealing element that maintains a seal between the top of the cowling and an outer cylindrical surface of the loader suction tube. The cowling includes a central top opening through which the loader suction tube extends and can move vertically relative to the cowling. An upper cavity is defined between the cowling and the upper portion of the cartridge. The cowling also includes an inlet coupled to a gas subsystem. The gas subsystem is configured to maintain a positive pressure of inert gas in the upper cavity.

In a third aspect of the disclosure a method is provided for delivering powder to a three dimensional printing system for fabricating a three dimensional article of manufacture. The method incudes the following step: loading a cartridge into a receptacle of the three dimensional printing system, the cartridge including (1) a lower portion defining a lower cavity containing powder, (2) a thin sealing member sealing the lower cavity from an outside atmosphere, and (3) an upper portion defining a peripheral sealing surface.

In one implementation the method further includes lowering a powder transfer assembly into engagement with the cartridge, the powder transfer assembly including a cowling and a loader suction tube that extends through and is vertically movable relative to the cowling. The cowling includes an inside sealing surface that engages the peripheral sealing surface during the engagement whereupon an upper cavity is defined between the cowling and the upper portion of the cartridge. A positive pressure of inert gas is provided to the upper cavity. The loader suction tube is displaced downwardly whereby the loader suction tube pierces the thin sealing member. A vacuum is then applied as the loader suction tube is advanced downwardly into the powder.

DETAILED DESCRIPTION OF THE PREFERRED EMBODIMENTS

Figure 1:
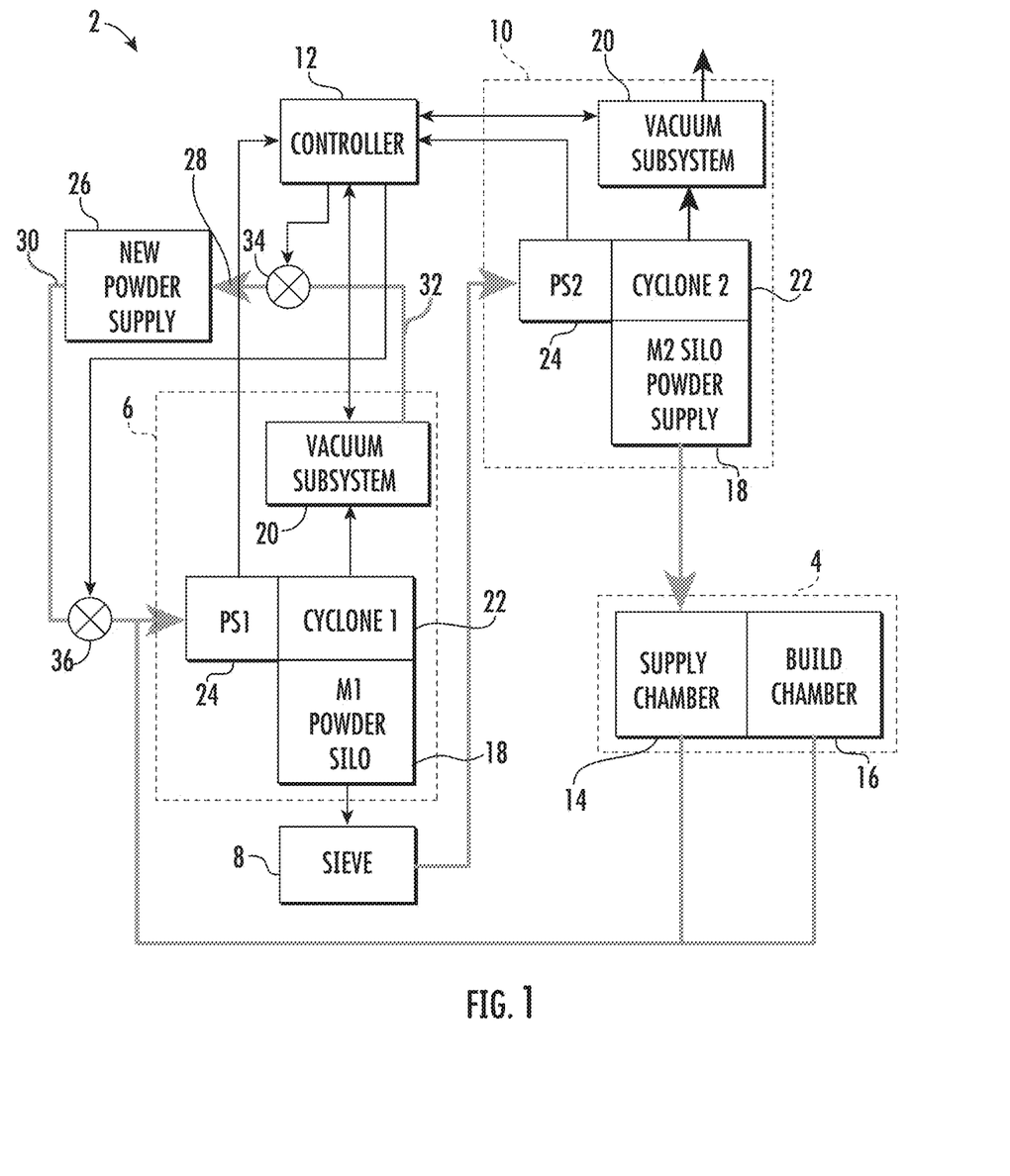
FIG. 1 is a schematic block diagram of an exemplary three dimensional printing system.

FIG. 1 is schematic block diagram of an exemplary three dimensional (3D) printing system 2 that has a novel system for handling powder that is particularly advantageous for handling metal powder. In this block diagram, a fluidic movement of powder through conduits (e.g., flexible hoses) will be depicted by thick gray arrows. Moving powder is entrained by a gaseous stream passing through a conduit. Preferably the gas velocity through each conduit is at least about 20 meters per second to properly entrain the powder. In this diagram, thinner black lines depict electrical or wireless connections between system components. For illustrative simplicity not all couplings, whether fluidic or electrical or wireless, are shown.

3D printing system 2 includes a print engine 4 for fabricating 3D articles of manufacture through the binding and/or fusion of powder. A first powder handling module 6 receives new powder and/or excess powder from print engine 4. First powder handling module 6 delivers the powder to a sieve 8. A second powder handling module 10 receives powder from sieve 8 and delivers the powder to print engine 4. A controller 12 is electrically and/or wirelessly coupled to print engine 4, first powder handling module 6, and second powder handling module 10. Controller 12 may be coupled to other components that are not shown.

Print engine 4 includes a supply chamber 14 that provides layers of powder to a build chamber 16. The build chamber 16 includes a means of fusing or binding the powder (not shown). In one embodiment a means of fusing is a high powered beam generator (laser and/or electron beam) for selectively fusing metal powder. Excess and/or used powder from supply chamber 14 and build chamber 16 is transferred to first powder handling module 6.

The first powder handling module 6 includes a first silo 18 for receiving, storing and dispensing powder. A vacuum subsystem 20 induces a gaseous stream flow from the print engine 4 to the first silo 18. First powder handling module 6 includes a first cyclone 22 that receives the gaseous stream from print engine 4 and separates the powder from the gas stream and delivers the separated powder to the first silo 18. Cyclone 22 can also be referred to as a "tornado separator" 22, a "powder separator" 22, a "cyclonic separator" or just a separator 22. Coupled to first silo 18 is a first pressure sensor 24. First pressure sensor 24 provides a signal to controller 12 which controls the first vacuum subsystem 20 in response. The controller 12 regulates the flow rate of the gaseous stream from the print engine 4 and through the cyclone 22 in response to the signal received from the pressure sensor 24.

The second powder handling module 10 is similar in structure, operation, and function to the first powder handling module 6. Second powder handling module 10 includes a second silo 18, a second vacuum subsystem 20, a second cyclone 22, and a second pressure sensor 24. The controller 12 regulates the flow of the gaseous stream from sieve 8 and through second cyclone 22 in response to signals from second pressure sensor 24. Because of their close similarity, modules 6 and 10 have common element numbers for similar internal components. In an exemplary embodiment there is just one vacuum subsystem 20 shared by the powder handling modules 6 and 10.

In an exemplary embodiment the powder is a metal powder. The gas used for transporting the powder through various conduits (gray lines) is an inert gas such as argon. A new powder supply 26 is for providing fresh powder to the three dimensional printing system 2. The new powder supply 26 has a gas inlet 28 for receiving inert gas and an outlet 30 for providing powder to the three dimensional printing system 2.

Vacuum subsystem 20 has an exhaust outlet 32 that is coupled to the inlet 28 of the new powder supply 26. Thus, the exhaust outlet 32 provides positively pressurized inert gas to the new powder supply 26. Between the exhaust outlet 32 and the inlet 28 is a valve 34 that is controlled by controller 12. This can be utilized to regulate a positive pressure of inert gas delivered to the inlet 28.

The outlet 30 is a loader suction tube 30 that is coupled to the silo 18 via the cyclone 22. Between the outlet 30 and the silo 18 is a valve 36 that is under control of the controller 12. The valve 36 can be used to activate or deactivate the loader suction tube 30.

The controller 12 includes a processor coupled to an information storage device. The information storage device includes a non-volatile or non-transient storage device storing software instructions that, when executed by the processor, operate the three dimensional printing system 2. The operation includes receiving and responding to signals from the pressure sensors 24. The operation also includes operating the print engine 4, the vacuum subsystem(s) 20, the new powder supply 26, and the valves 34 and 36. This includes some of the steps of method 80 of FIG. 4. The controller 12 can be at one location or distributed among multiple locations within the three dimensional printing system 2.

Figure 2:
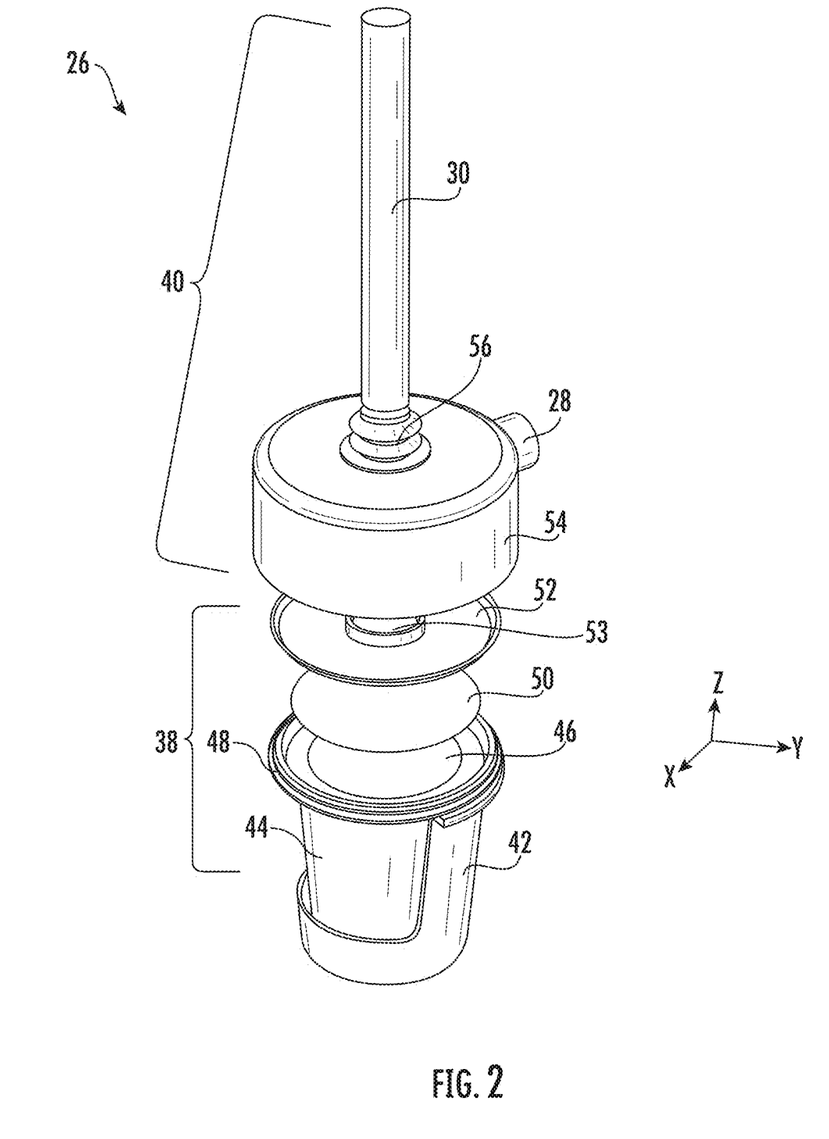
FIG. 2 is an exploded isometric view of an exemplary new powder supply.

FIG. 2 is an exploded isometric view of an exemplary new powder supply 26. In describing the new powder supply mutually orthogonal axes X, Y, and Z will be utilized. Generally speaking directions in X and Y will be described as radial or lateral directions. Axis Z will be described as a vertical or central axis. A distance R is a radial distance from the central axis Z of the new powder supply 26. The axis Z is not necessarily perfectly aligned with a gravitational reference.

New powder supply 26 includes a replaceable cartridge 38, a powder transfer assembly 40, and a receptacle 42 for receiving and holding the cartridge 38. The powder transfer assembly 40 is for engaging the cartridge 38 for transferring metal powder from the cartridge 38 to the silo 18.

The cartridge 38 includes a molded vessel 44 for holding the metal powder and having an opening 46 and a peripheral sealing surface 48 at an upper end. A thin sealing member 50 is for closing the opening 46 in order to seal off the metal powder from an outside atmosphere. In one embodiment the thin sealing member 50 is a polymer film with a metal outer layer. A top lid 52 is for providing mechanical support for the molded vessel 44 and the thin sealing member 50. The top lid 52 includes a central opening 53 to allow the loader suction tube 30 to enter the cartridge 38. The peripheral sealing surface 48 surrounds the opening 46 and the thin sealing member 50.

The powder transfer assembly 40 includes cowling 54 and loader suction tube 30. The loader suction tube 30 can be axially displaced along vertical axis Z relative to the cowling 54. A sealing element 56 provides a gas seal between the loader suction tube 30 and the cowling 54. Cowling 54 also includes gas inlet 28 for receiving positively pressurized inert gas.

Figure 3:
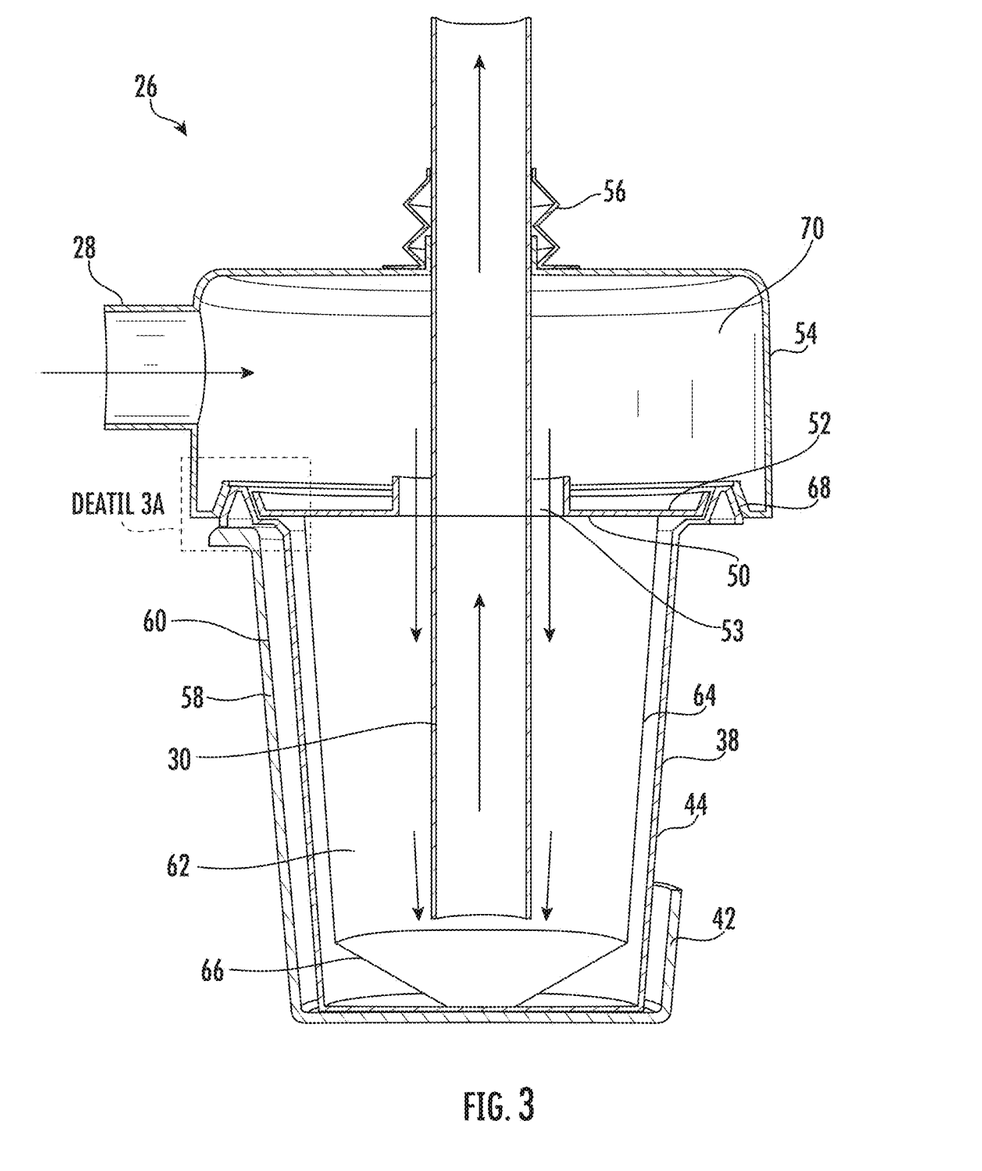
FIG. 3 is a side cross sectional view of an exemplary new powder supply.

FIG. 3 is a side cross sectional view of an exemplary new powder supply 26 when the powder transfer assembly 40 is engaged with the cartridge 38. Like figure elements signify the same element in comparison with FIG. 2.

Cartridge 38 includes a lower portion 58 with an inside surface 60 that defines a lower cavity 62 containing the metal powder. The metal powder is contained within a collapsible bag 64 having a tapering distal lower end 66 for maximizing extraction efficiency of the metal powder. In the illustrative embodiment the lower portion 58 of the cartridge is a portion of the molded vessel 44.

The cartridge 38 also includes an upper portion 68 that is engaged by the cowling 54. The upper portion 68 of cartridge 38 is defined in part by the molded vessel 44 and the rigid lid 52. An upper cavity 70 is defined between the upper portion 68 of the cartridge and the cowling 54.

When powder is being extracted from cartridge 38 there is a vacuum that exerts an upward flow through the loader suction tube 30. At the same time, a positive pressure of inert gas is being provided to cowling inlet 28 in order to maintain a positive pressure in the upper cavity 70. The result is a flow of inert gas into the inlet 28, into the upper cavity 70, down to the lower cavity 62, and into loader suction tube 30. As a result any powder dust will be suctioned up into the loader suction tube 30. Also an inert gas atmosphere will be constantly maintained around any powder to prevent a risk of oxidizing metal powder and/or combustion of metal powder.

Figure 3A:
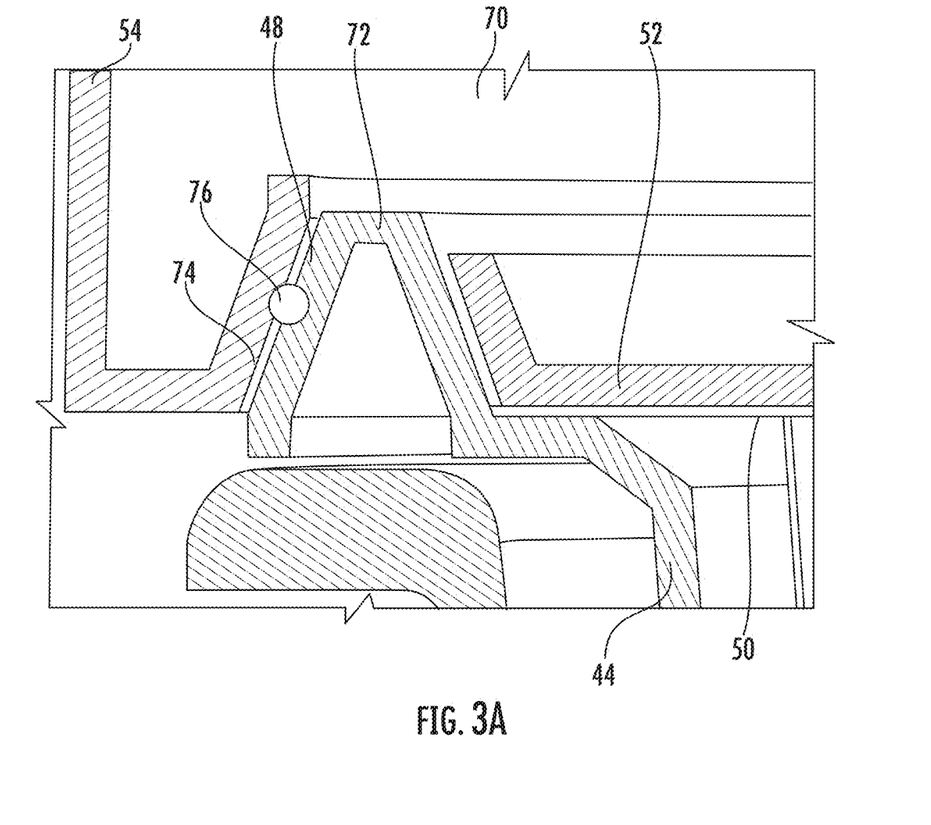
FIG. 3A is a detail view taken from "Detail 3A" of FIG. 3.

FIG. 3A is "Detail A" taken from FIG. 3. The molded vessel 44 includes an upper annular rim 72 (at the upper portion of cartridge 38) that tapers upwardly. The upper annular rim 72 defines the peripheral sealing surface 48. The peripheral sealing surface 48 faces radially outwardly and upwardly. The cowling has an inside sealing surface 74 that faces radially inwardly and downwardly. Between the peripheral sealing surface 48 and the inside sealing surface 74 is an annular compliant member 76 such as an O-ring. The seal of the peripheral sealing surface 48 to the inside sealing surface 76 seals the upper cavity 70 from an outside atmosphere.

Figure 4:
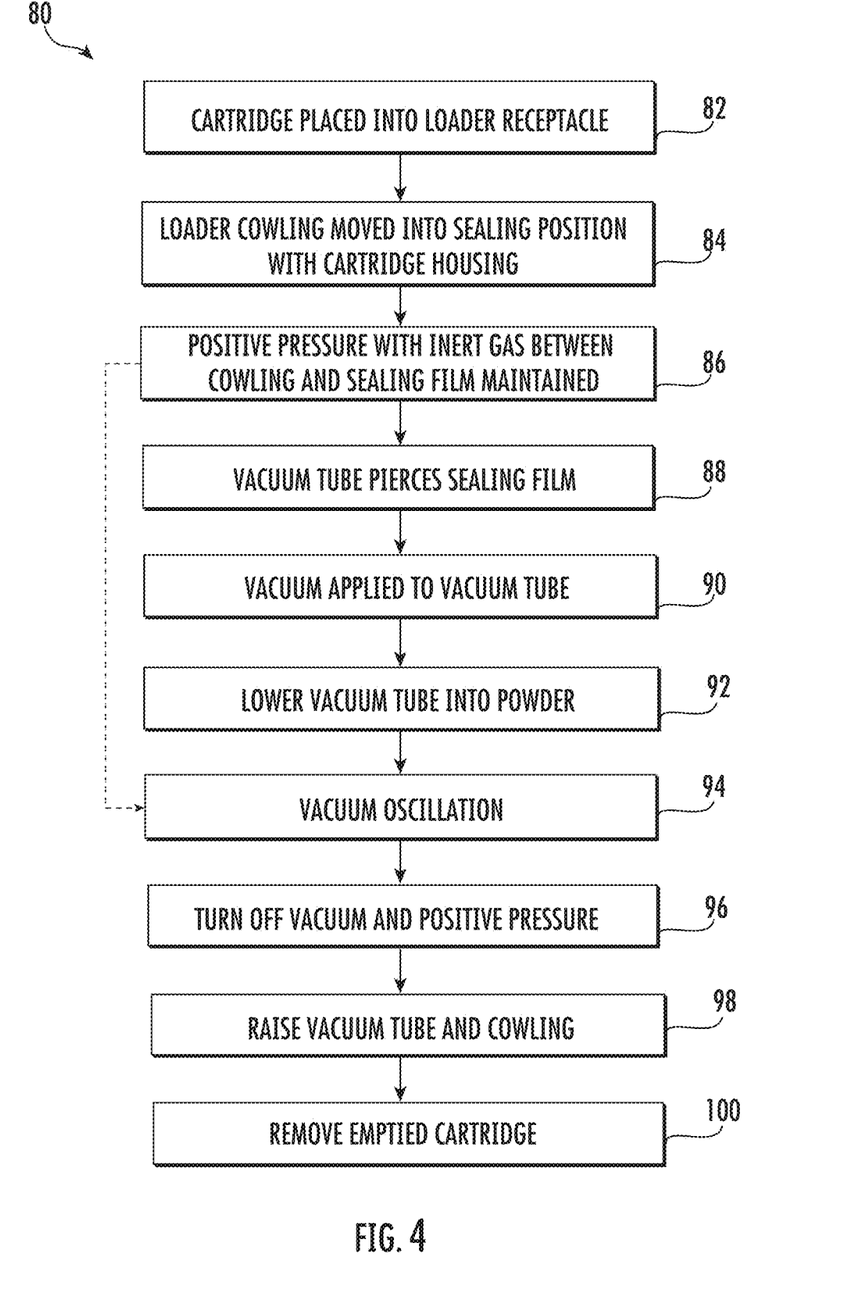
FIG. 4 is a flowchart representation of an exemplary method for loading powder from a cartridge into a three dimensional printing system.
Figure 5:
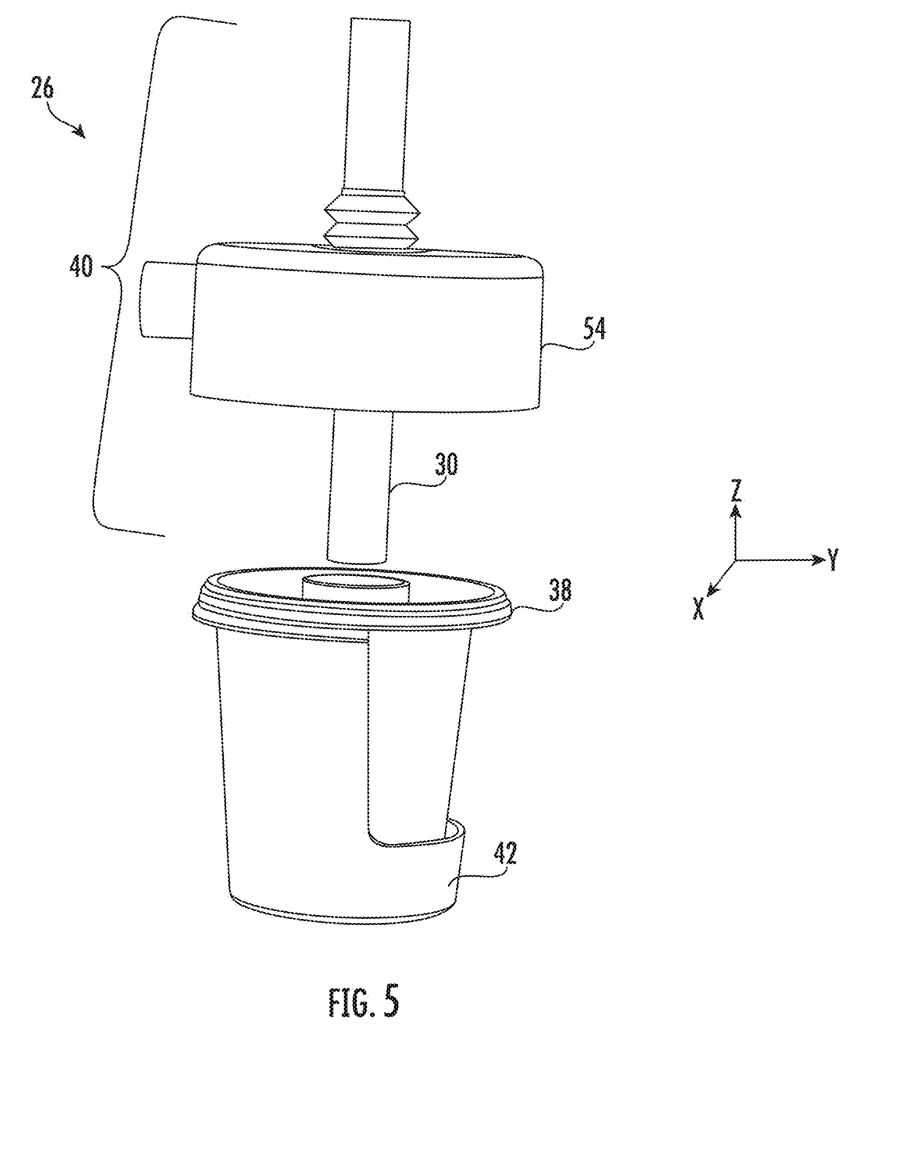
FIG. 5 is an isometric view depicting a cartridge loaded into a receptacle before a powder transfer assembly engages the cartridge.
Figure 6:
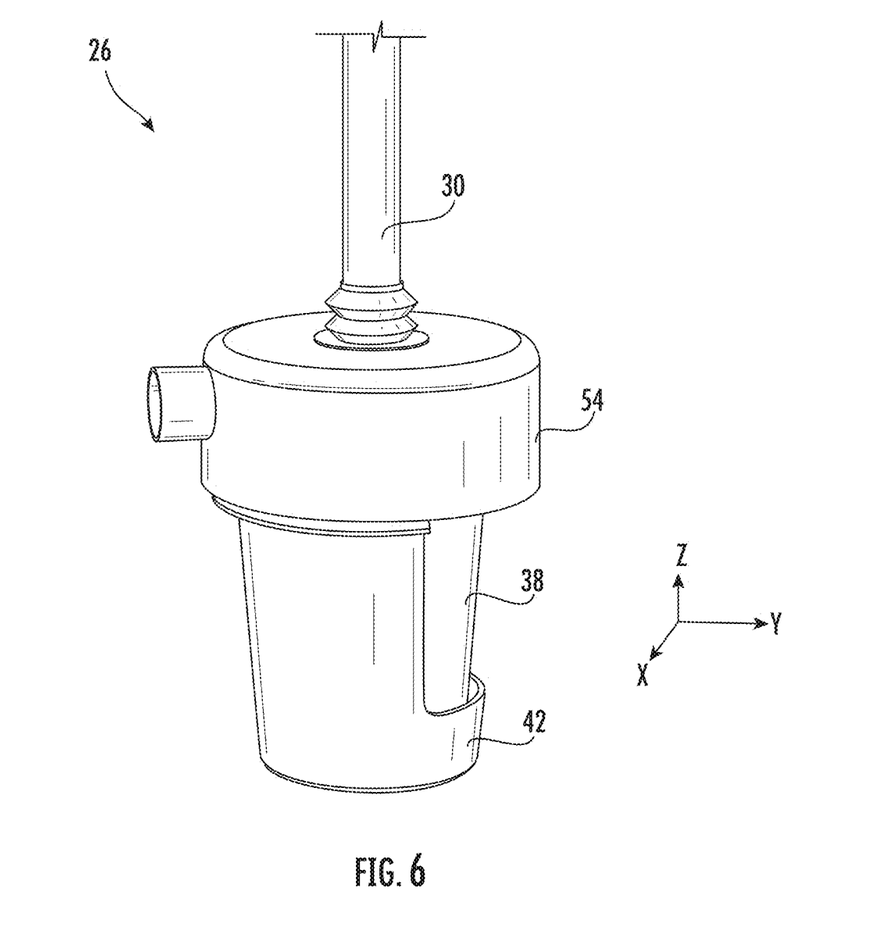
FIG. 6 is an isometric view of a cartridge loaded into a receptacle after a powder transfer assembly engages the cartridge.
Figure 7:
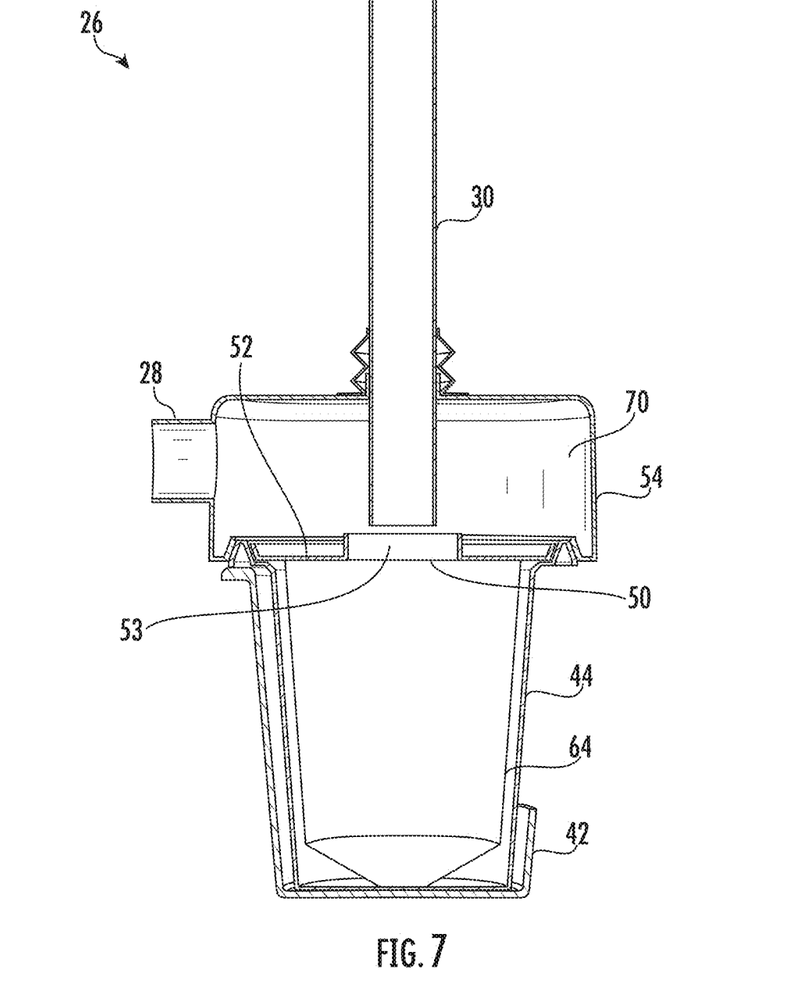
FIG. 7 is a cross sectional view of a cartridge loaded into a receptacle after a cowling engages an upper portion of the cartridge but before a vacuum loader tube has pierced a thin sealing member.

FIG. 4 is a flowchart representation of an exemplary method 80 for loading powder from the cartridge 38 into a silo 18. FIGS. 5-7 are illustrations depicting some stages of method 80. According to step 82, the cartridge 38 is loaded into the loader receptacle 42. This is illustrated in isometric form in FIG. 5. The powder transfer assembly 40 is in position above cartridge 38.

According to step 84, the cowling 54 is lowered into engagement and sealed to the upper portion of cartridge 38 whereby the upper cavity 70 is defined and sealed from an outside atmosphere. As part of step 84 the inside sealing surface 74 of the cowling seals to the peripheral sealing surface 48 as is illustrated in FIG. 3A. FIG. 6 is an isometric view after step 84. FIG. 7 depicts a cross-sectional view after step 84 and for step 86. The loader suction tube 30 has not yet pierced the thin sealing member 50.

According to step 86, valve 34 is opened and a positive pressure of inert gas is applied to the inlet 28 of the cowling 54. The dashed arrow line of FIG. 4 indicates that this positive pressure will continue to be applied through step 94.

According to step 88 the vacuum loader tube 30 passes through the opening 53 in lid 52 pierces the thin sealing member 50. According to step 90, vacuum is applied to the vacuum loader tube 30 and metal powder begins to be transported from the collapsible bag 64 and up through the vacuum loader tube 30. According to step 92, the vacuum loader tube 30 is lowered into the powder as the vacuum continues to be applied. According to step 92 the vacuum is maintained until the powder extraction is complete.

According to step 96 the vacuum applied to the vacuum loader tube 30 and the positive inert gas pressure applied to the inlet 28 are discontinued. According to step 98 the powder transfer assembly 40 is disengaged from the cartridge 38 and raised. According to step 100 the cartridge 38 is removed from the receptacle 42.

In an exemplary embodiment the vacuum applied to the vacuum loader tube 30 is oscillated during step 94. This has the effect of shaking the collapsible bag 64 and increasing the completeness of powder extraction and uptake by the vacuum loader tube 30.

The specific embodiments and applications thereof described above are for illustrative purposes only and do not preclude modifications and variations encompassed by the scope of the following claims.

What is claimed:
1. A powder delivery system for providing powder to a three dimensional printing system comprising:
   a cartridge including:
   a lower portion defining a lower cavity for containing the powder;

a thin sealing member that seals the lower cavity from an outside atmosphere before being pierced by a loader suction tube;

a top lid portion that partially covers the thin sealing member and defines an upper opening to allow the loader suction tube to gain access to the thin sealing member; and an upper portion defining a peripheral sealing surface to allow a cowling to seal over the upper opening.

2. The powder delivery system of claim 1 wherein the cartridge includes a molded vessel that defines an inside surface that further defines the lower cavity.

3. The powder delivery system of claim 2 further comprising a collapsible bag disposed within the lower cavity that contains the powder.

4. The powder delivery system of claim 2 wherein the molded vessel defines the peripheral sealing surface.

5. The powder delivery system of claim 1 wherein the upper portion of the cartridge has an upper annular rim that tapers upwardly and defines the peripheral sealing surface.

6. The powder delivery system of claim 5 wherein the peripheral seal surface faces radially outwardly for engaging an inside sealing surface of the cowling.

7. The powder delivery system of claim 6 wherein the peripheral sealing surface includes a compressible member to provide compliance and sealing engagement with the inside sealing surface of the cowling.

8. The powder delivery system of claim 1 further comprising a powder transfer assembly that includes:

the loader suction tube; and the cowling.

9. The powder delivery system of claim 8 wherein the cowling includes a central top opening through which the loader suction tube extends and can move vertically relative to the cowling.

10. The powder delivery system of claim 9 further comprising a sealing element that maintains a seal between the top of the cowling and an outer cylindrical surface of the loader suction tube.

11. The powder delivery system of claim 8 wherein the cowling includes an inlet coupled to a gas subsystem to maintain the inert gas within an upper cavity defined between the cowling and an upper area of the cartridge.

12. The powder delivery system of claim 11 further comprising the gas subsystem which is configured to maintain a positive pressure within the upper cavity.

13. A method of delivering powder to a three dimensional printing system for fabricating a three dimensional article of manufacture comprising:

loading a cartridge into a receptacle of the three dimensional printing system, the cartridge including:

a lower portion defining a lower cavity containing the powder;

a thin sealing member sealing the lower cavity from an outside atmosphere; and an upper portion defining a peripheral seal, the method further comprising lowering a powder transfer assembly into engagement with the cartridge, the powder transfer assembly including a cowling and a loader suction tube that extends through and is vertically movable relative to the cowling.

14. The method of claim 13 wherein the cowling includes an inside sealing surface that engages the peripheral sealing surface of the upper portion of the cartridge during the engagement to thereby define an upper cavity between the cowling and the upper portion of the cartridge.

15. The method of claim 13 further comprising applying a positive pressure of an inert gas to the upper cavity.

16. The method of claim 13 further comprising vertically displacing the loader suction tube downwardly whereby the loader suction tube pierces the thin sealing member.

17. The method of claim 16 further comprising applying a vacuum to the loader suction tube as lower distal end of the loader suction tube is advanced downwardly into the powder.

18. A powder delivery system for delivering powder to a three dimensional printing system comprising:

a housing for containing powder including a lower portion containing powder and an upper portion defining a peripheral sealing surface;

a cowling configured to seal to the peripheral sealing surface whereby an annular space between the cowling and the upper portion of the cartridge can be positively pressurized, the cowling defining a central opening; and a suction tube configured to extend through the central opening of the cowling to allow a distal end of the suction tube to extend into the lower portion of the housing during extraction of powder from the housing.

19. The powder delivery system of claim 18 wherein the cowling includes a sealing element for forming a radial seal with the loader suction tube.

* * * * *